(12) United States Patent  (10) Patent No.: US 6,742,943 B2
Ushiro  (45) Date of Patent: Jun. 1, 2004

(54) IMAGING DEVICE

(75) Inventor: Seimei Ushiro, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/620,447

(22) Filed: Jul. 17, 2003

(65) Prior Publication Data

US 2004/0062545 A1 Apr. 1, 2004

(30) Foreign Application Priority Data

Jul. 23, 2002 (JP) ........................................ 2002-213356
Apr. 3, 2003 (JP) ........................................ 2003-099952

(51) Int. Cl.[7] ............................................... G03B 17/12
(52) U.S. Cl. .................... 396/529; 396/535; 348/360; 348/376
(58) Field of Search ................................ 396/448, 529, 396/535; 348/360, 376

(56) References Cited

U.S. PATENT DOCUMENTS 4,728,977 A * 3/1988 Yomogizawa et al. ...... 396/349
6,002,885 A * 12/1999 Kaneda ........................ 396/72

* cited by examiner

Primary Examiner—W. B. Perkey
(74) Attorney, Agent, or Firm—Young & Thompson

(57) ABSTRACT

When a lens unit is to be mounted, the lens unit is moved downward along guide grooves, whereby an opening portion cover is also pushed down counter to an elongation force of coil springs, the lens unit is mounted to a camera body, and the opening portion cover is moved to an open position. When the lens unit is to be removed, the lens unit is moved along the guide grooves, whereby engagement with the guide grooves is released. Because the opening cover portion is urged from the open position to a closed position by the coil spring at this time, the opening portion cover is moved with the lens unit along the guide grooves and fixed at the closed position.

20 Claims, 14 Drawing Sheets

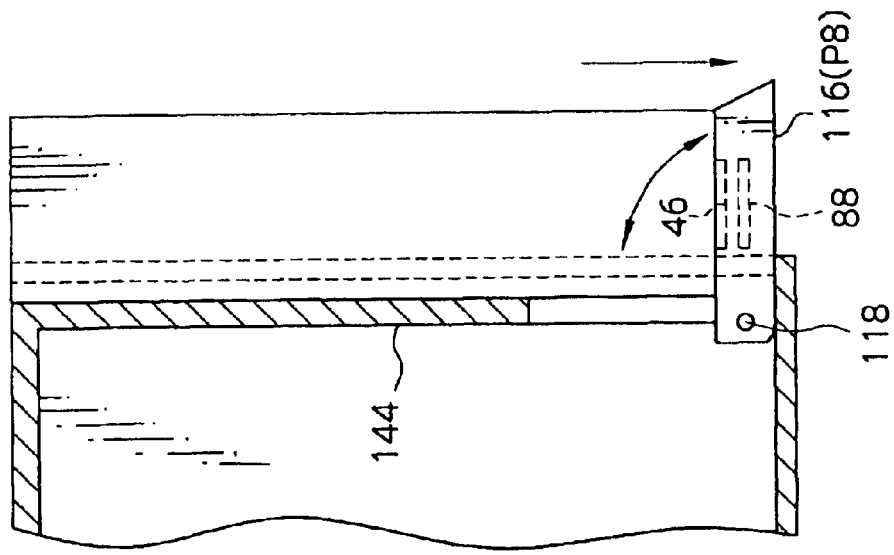
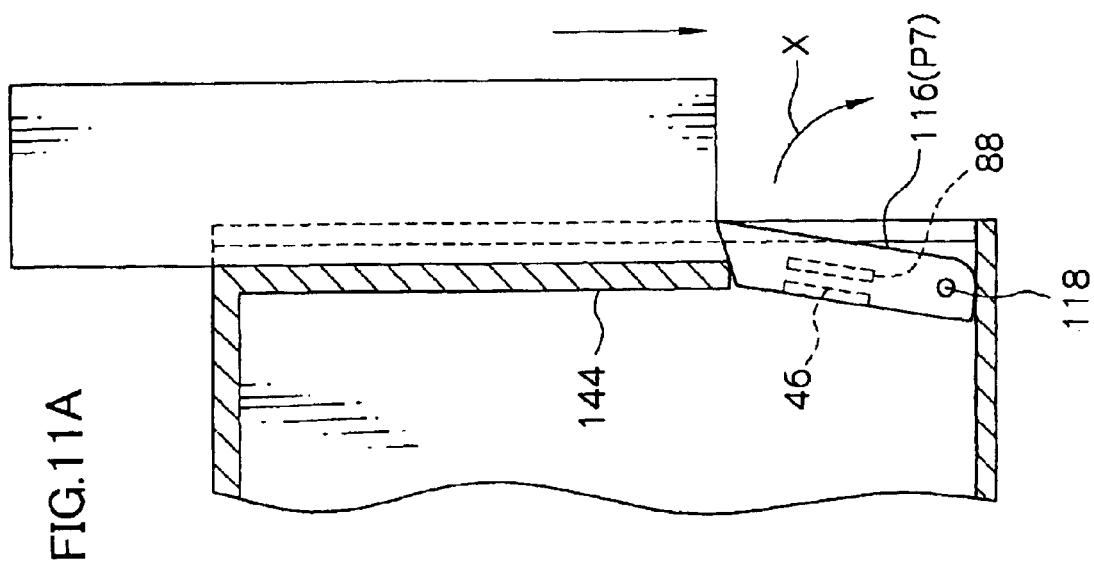

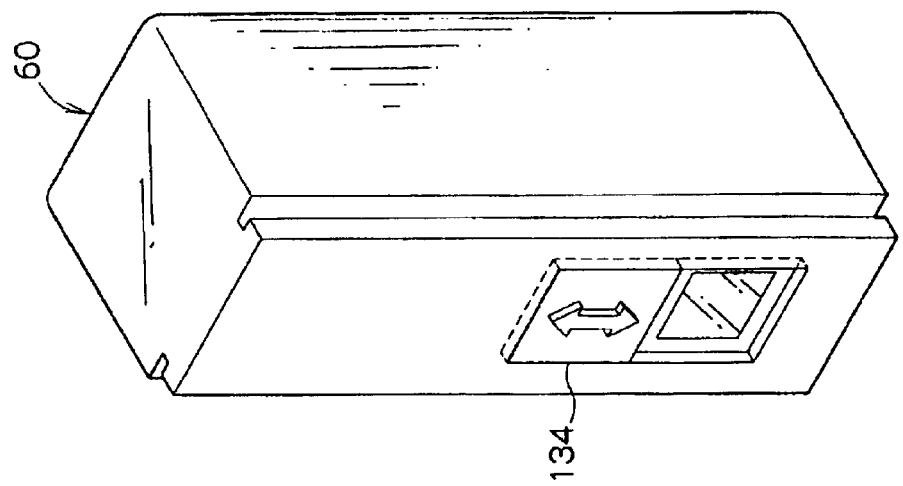
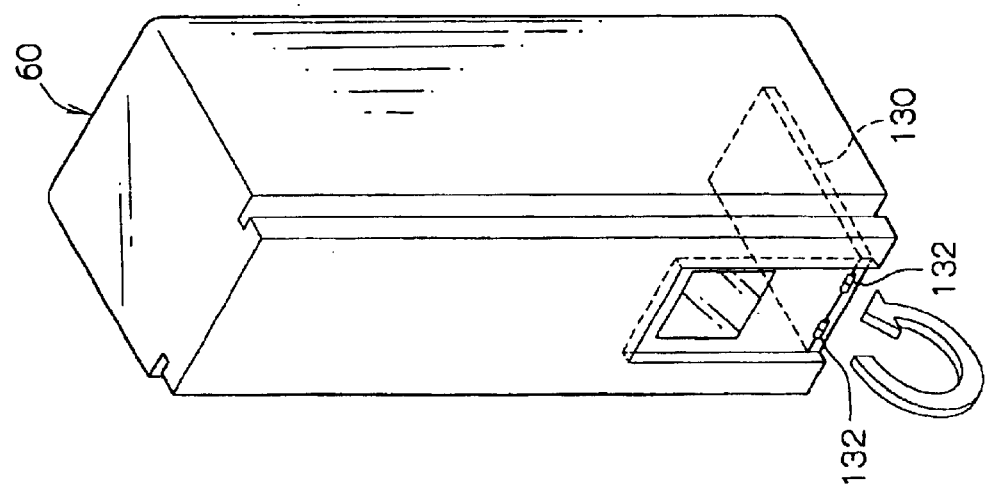

IMAGING DEVICE

CROSS-REFERENCE TO RELATED APPLICATION

This application claims priority under 35 USC 119 from Japanese Patent Application Nos. 2002-213356 and 2003-99952, the disclosure of which are incorporated by reference herein.

BACKGROUND OF THE INVENTION

1. Field of the Invention

The present invention relates to an imaging device, and in particular to an imaging device to which an imaging-use lens unit can be attached and from which the imaging-use lens unit can be detached.

2. Description of the Related Art

In imaging devices to which an imaging-use lens unit can be attached and from which the imaging-use lens unit can be detached, such as a lens-replaceable single lens reflex camera, it is preferable to configure the imaging device so that foreign matter, such as dirt or dust, does not enter the inside of the imaging device body, when the imaging-use lens unit has been removed, through an opening portion disposed in a portion at which the imaging device body and the imaging-use lens unit are joined. That necessity is particularly high for digital cameras that import images using an imaging element because, when dust or the like adheres to the imaging element, the imaging element of the portion to which dust adheres becomes unable to properly receive light, and problems always arise in images captured thereafter. When the imaging-use lens unit is disposed with an imaging element, it is also necessary to prevent dirt or the like from adhering to a connector portion between the imaging-use lens unit and the imaging device.

In order to prevent the ingress or adherence of foreign matter, a video camera has been proposed in Japanese Utility Model Application Laid-Open Publication No. 2-23170 in which an openable/closeable dustproof cover is disposed at the opening portion. However, in this technology, an interchangeable lens is fitted after the dustproof cover has been opened by the hand of a user. Therefore, sometimes foreign matter enters during the period of time from after the opening portion has been opened to until the interchangeable lens is fitted.

In Japanese Patent Application Laid-open Publication (JP-A) No. 2000-241869, there is described an electronic camera device in which a transparent cover that constantly maintains air-tightness of the inside space is disposed at the opening portion of the camera body. According to this invention, foreign matter can be reliably prevented from entering the inside.

However, because the cover is also fitted at the time of shooting, there has been the problem that optical loss and reflection affect the captured image.

SUMMARY OF THE INVENTION

The present invention has been devised in order to eliminate the above-described problem, and it is an object thereof to provide an imaging device that deters foreign matter from entering or adhering to a predetermined portion of the imaging device, and in which there are few adverse optical affects, in a state in which an imaging-use lens unit has been removed.

In order to achieve this object, a imaging device according to a first aspect is an imaging device to which an imaging-use lens unit can be attached and from which the imaging-use lens unit can be detached, the imaging device including: a casing disposed with an opening portion for allowing light from the imaging-use lens unit to be made incident inside; and an opening portion cover that is disposed at the casing and is movable between a closed position that closes the opening portion and an open position that opens the opening portion, wherein, when the imaging-use lens unit is to be mounted, the opening portion cover is pushed by the imaging-use lens unit and is movable from the closed position to the open position.

A imaging device according to a second aspect includes: an imaging-use lens unit that can image light from a subject; a casing to which the imaging-use lens unit can be attached and from which the imaging-use lens unit can be detached, the casing being disposed with an opening portion for allowing light from the imaging-use lens unit to be made incident inside; and an opening portion cover that is disposed at the casing and is movable between a closed position that closes the opening portion and an open position that opens the opening portion, wherein, when the imaging-use lens unit is to be mounted, the opening portion cover is pushed by the imaging-use lens unit and is movable from the closed position to the open position.

In the imaging devices according to the first and second aspects, the opening portion cover is movable between the closed position that closes the opening portion and the open position that opens the opening portion. Thus, in a state in which the imaging-use lens unit is removed from the imaging device, the opening portion can be closed by moving the opening portion cover to the closed position. Thus, foreign matter can be deterred from entering the casing through the opening portion. Also, in a state in which the imaging-use lens unit is mounted to the imaging device, the opening portion cover is positioned at the open position so that it can open the opening portion. Thus, because light from the imaging-use lens unit passes through the opened opening portion and is directly made incident inside the imaging device, adverse optical affects such as optical loss and reflection can be reduced in comparison to devices in which transparent glass or the like is disposed at the opening portion. Moreover, because the opening portion cover is opened by the imaging-use lens unit being mounted, foreign matter can be deterred from entering the casing during the period of time from after the opening portion cover is opened until the imaging-use lens unit is mounted. It also becomes unnecessary to open the opening portion cover by an independent operation, whereby convenience is improved.

It should be noted that digital cameras, film cameras (silver cameras), video cameras, camera-attached mobile telephones, and PDAs (Personal Digital Assistants) are included in the imaging device.

The imaging devices according to the first and second aspects can further include a moving member that causes the opening portion cover to move from the open position to the closed position in conjunction with an operation by which the imaging-use lens unit is removed.

Here, a member that has an elastic force, such as a spring or rubber, that can urge the opening portion cover from the open position to the closed position can be used as the moving member.

According to the above-described configuration, because the opening portion cover is automatically moved from the open position to the closed position by the moving member in conjunction with an operation by which the imaging-use lens unit is removed, it becomes unnecessary to manually close the opening portion cover and convenience is improved.

The imaging devices according to the first and second aspects can further include a guide member that movably guides the opening portion cover along the casing between the open position and the closed position.

By disposing the guide member in this manner, the opening portion cover can be smoothly opened and closed.

In the imaging device according to the second aspect, the imaging-use lens unit can include deflecting means that deflects an optical axis of incident light.

According to the above-described configuration, because the light made incident at the imaging-use lens unit is deflected by the deflecting means, it is not necessary for the optical axis incident at the imaging-use lens unit and the optical axis of light made incident at the opening portion of the imaging device to match, the opening portion can be disposed at a free position, and the degree of freedom with which the imaging device is designed can be raised.

A imaging device according to a third aspect is an imaging device to which an imaging-use lens unit including an imaging element can be attached and from which the imaging-use lens unit can be detached, the imaging device including: a casing disposed with a connector for receiving image information imaged by the imaging-use lens unit; and a connector cover that is disposed at the casing and is movable between a cover position that covers the connector and an open position that opens the connector, wherein, when the imaging-use lens unit is to be mounted, the connector cover is pushed by the imaging-use lens unit and is movable from the cover position to the open position.

In the imaging device according to the third aspect, the connector cover is movable between the cover position that covers the connector and the open position that opens the connector. Thus, in a state in which the imaging-use lens unit is removed from the imaging device, the connector can be covered by moving the connector cover to the cover position. Thus, foreign matter can be deterred from adhering to the connector. Also, because the connector cover is opened by the imaging-use lens unit being mounted, foreign matter can be deterred from adhering to the connector during the period of time from after the connector cover is opened until the imaging-use lens unit is mounted. It also becomes unnecessary to open the connector cover by an independent operation, whereby convenience is improved.

It should be noted that digital cameras, film cameras (silver cameras), video cameras, camera-attached mobile telephones, and PDAs (Personal Digital Assistants) are also included in the third imaging device.

The imaging device according to the third aspect can further include a moving member that causes the connector cover to move from the open position to the cover position in conjunction with an operation by which the imaging-use lens unit is removed.

According to the above-described configuration, because the connector cover is automatically moved from the open position to the cover position by the moving member in conjunction with an operation by which the imaging-use lens unit is removed, it becomes unnecessary to manually close the connector cover and convenience is improved.

The imaging device according to the third aspect can further include a guide member that movably guides the connector cover along the casing between the open position and the cover position.

By disposing the guide member in this manner, the connector cover can be smoothly opened and closed.

The imaging devices according to the first, second and third aspects can further include transmitting means that can transmit imaged image information to an external device, whereby high convenience can be obtained.

BRIEF DESCRIPTION OF THE DRAWINGS

FIGS. 11A and 11B are explanatory drawings of positions of a cover member of the fifth embodiment;

FIGS. 12A and 12B are drawings showing modified examples of the lens unit;

DETAILED DESCRIPTION OF THE INVENTION

Embodiments of the invention will be described below with reference to the drawings. It should be noted that an imaging device of the invention will be described below using a digital camera as an example.

First Embodiment

Figure 1:
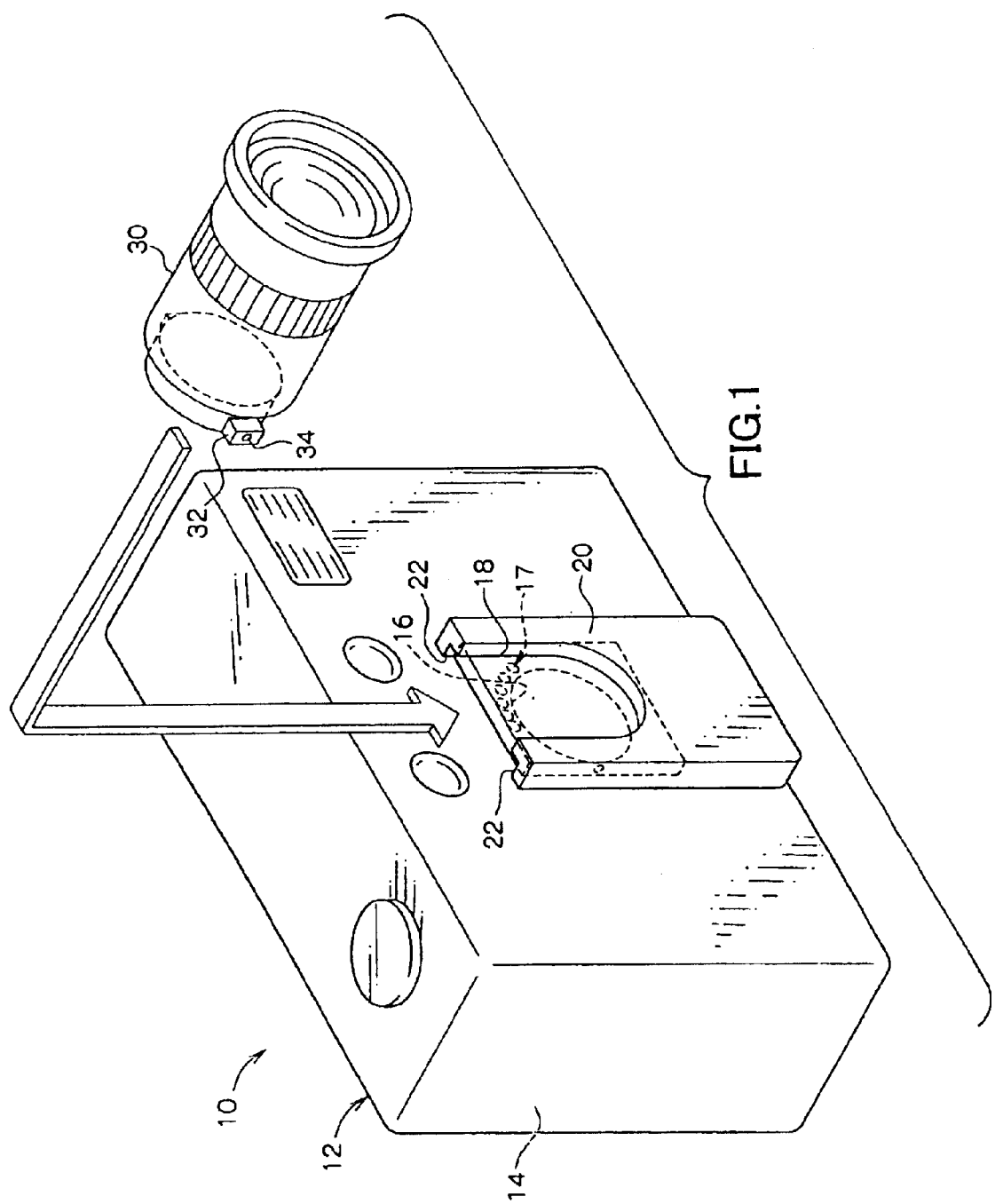
FIG. 1 is a schematic perspective view of a camera and a lens unit of a first embodiment.
Figure 2:
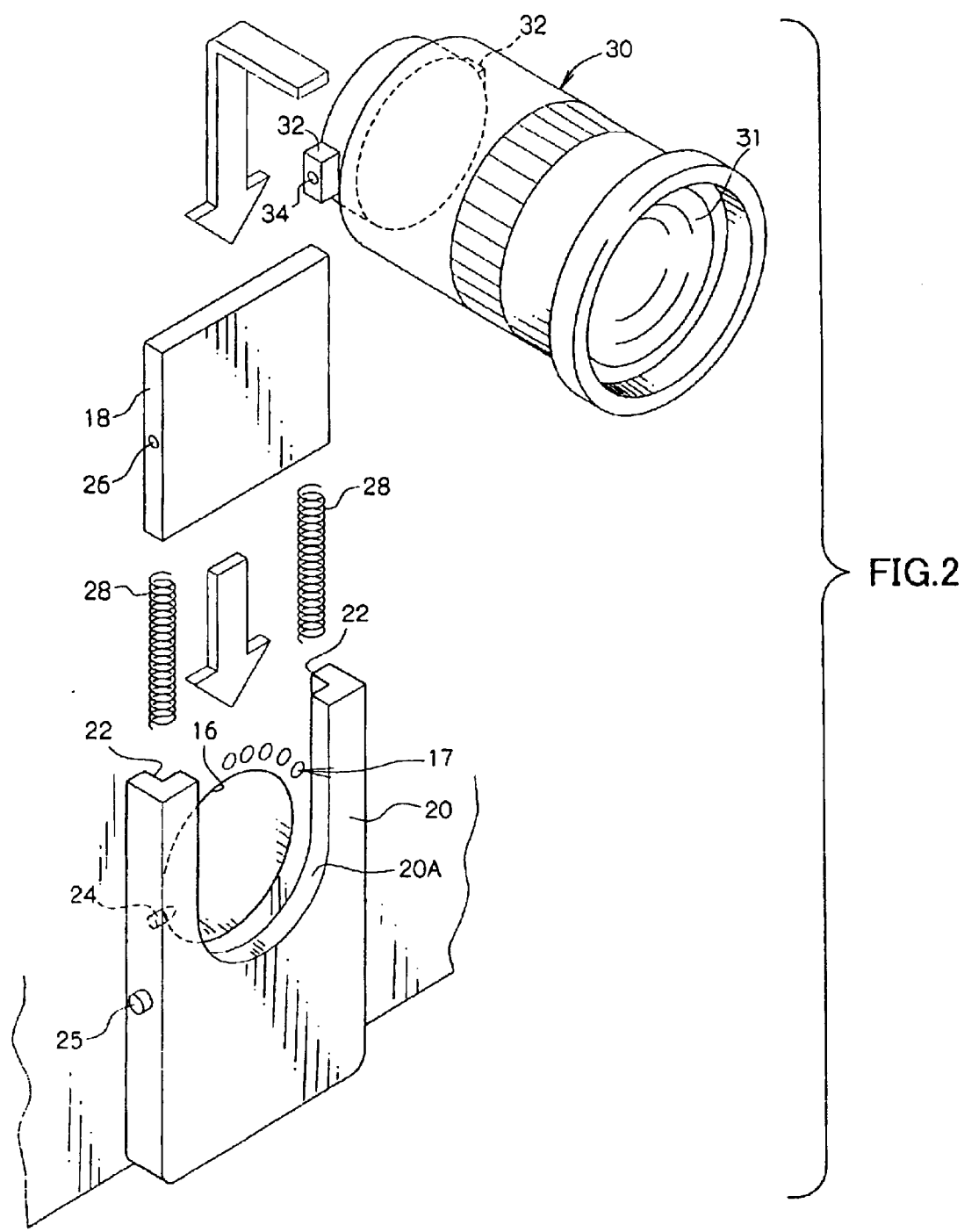
FIG. 2 is an exploded perspective view of a guide member, coil springs, an opening portion cover and the lens unit of the first embodiment.

A camera 10 serving as the imaging device of the present embodiment is disposed with a camera body 12 and a lens unit 30, as shown in FIGS. 1 and 2. An opening portion 16 for transmitting light to an unillustrated imaging element inside the camera body 12 is formed in a front surface of a casing 14 of the camera body 12. An opening portion cover 18 and a guide member 20 are disposed at an outer side of the opening portion 16. A U-shaped cutout portion 20A is formed in the guide member 20 at a position corresponding to the opening portion 16. The diameter of the U-shaped portion 20A is larger than the diameter of the opening portion 16 and is of a size that does not obstruct the incidence of light at the opening portion 16. A space is formed between the casing 14 and a portion of the guide member 20 that is lower than the U-shaped portion 20A, so that the opening portion cover 18 can move between the casing 14 and this lower portion of the guide member 20.

Guide grooves 22 are formed in the vertical direction between the casing 14 and inner sides of both side portions of the guide member 20. Inner side end portions of the opening portion cover 18 engage with the guide grooves 22, and the opening portion cover 18 is movable along the guide grooves 22 between a closed position P1 (see FIG. 3A) that closes the opening portion 16 and an open position P2 (see FIG. 3B) at a lower side of the guide member 20 that opens the opening portion 16. The opening portion cover 18 has a structure such that it is retained at the open position P2 by the guide member 20 and mounting members 32 of the lens unit 30 described later.

Pin-like engagement members 24 are disposed at inner sides of the guide grooves 22, and engagement holes 26 (one of the engagement holes 26 is not shown), with which the engagement members 24 can engage, are punched in two side end surfaces of the opening portion cover 18. The engagement members 24 are urged, by unillustrated urging means, toward projecting positions projecting further from the inner side surfaces of the guide grooves 22 than these surfaces, engage with the engagement holes 26 by being inserted into the engagement holes 26, and fix the opening portion cover 18 at the closed position P1. Also, by pressing down a release button 25 disposed at the outer side of the guide member 20, the engagement members 24 are pulled from the inner side surfaces of the guide grooves 22, whereby the engagement with the engagement holes 26 is released.

Two coil springs 28 serving as moving members are disposed along the guide grooves 22 at lower sides of both side end portions of the opening portion cover 18. One end of each coil spring 28 is fixed at a bottom side of the guide member 20 and the other end of each coil spring 28 is fixed at a lower end surface of the opening portion cover 18. The opening portion cover 18 is urged toward the closed position P1 from the open position P2 by a force of elongation of the coil springs 28. It should be noted that movement of the opening portion cover 18 upward from the closed position P1 is deterred by an unillustrated deterring member.

The lens unit 30 is disposed with a shooting lens 31 and two mounting members 32. The mounting members 32 are positioned at side portions of a side that is mounted to the camera body 12 and are engageable with the guide grooves 22. In a state in which the mounting members 32 are engaged with the guide grooves 22, the lens unit 30 is movable along the guide grooves 22.

Engagement holes 34, with which the engagement members 24 can engage, are punched in end surfaces of the mounting members 32. The engagement members 24 engage with the engagement holes 34 in a manner similar to the case of the engagement holes 26, and fix the lens unit 30 at a position closing the opening portion 16, i.e., at a lens unit 30 fitting position (see FIG. 3B). By pushing down the release button 25, the engagement members 24 are pulled from surfaces of the guide grooves 22, whereby the engagement with the engagement holes 34 is released.

Various contact points 17 are disposed at an upper side of a mounting surface of the lens unit 30 and at an upper side of the opening portion 16 of the camera body 12 (the contact points of the lens are not shown), and the camera body 12 and the lens unit 30 are electrically connectable by mutually corresponding contact points being connected.

Next, the action of the present embodiment will be described.

Figure 3A:
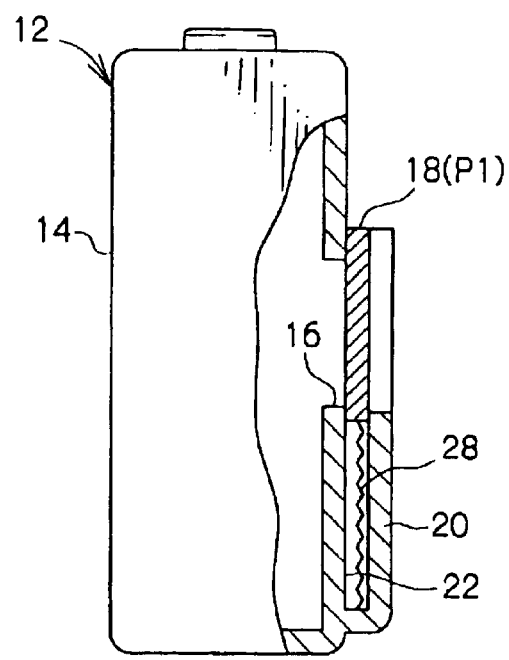
FIGS. 3A and 3B are explanatory drawings of positions of the opening portion cover in the first embodiment.
Figure 3B:
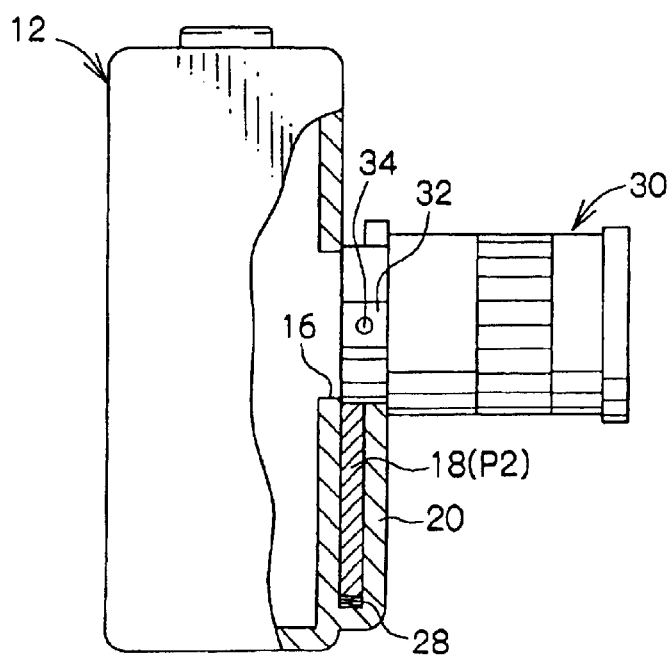

In a state in which the lens unit 30 is removed, the engagement members 24 and the engagement holes 26 are engaged, and the opening portion cover 18 is fixed at the closed position P1 (see FIG. 3A). When the lens unit 30 is to be mounted, the user pushes the release button 25 to release the engagement between the engagement members 24 and the engagement holes 26. The mounting members 32 are made to engage with the guide grooves 22 and the lens unit 30 is moved downward along the guide grooves 22. At this time, the lens unit 30 is brought into contact with the upper end surface of the opening portion cover 18, and the opening portion cover 18 is also pushed down counter to the elongation force of the coil springs 28. When the engagement holes 34 of the lens unit 30 are moved to the positions of the engagement members 24, the engagement members 24 enter the engagement holes 34, the engagement holes 34 and the engagement members 24 engage, and the lens unit 30 is mounted to the camera body 12. At this time, the opening portion cover 18 is moved to the open position P2 and fixed at this position.

When the lens unit 30 is to be removed, the user pushes the release button 25 to release the engagement between the engagement members 24 and the engagement holes 34. The lens unit 30 is moved upward along the guide grooves 22 and the engagement with the guide grooves 22 is released. At this time, because the opening portion cover 18 is urged from the open position P2 to the closed position P1 by the coil springs 28, the opening portion cover 18 moves upward with the lens unit 30 along the guide grooves 22. When the engagement holes 26 are moved to the positions of the engagement members 24, the engagement members enter the engagement holes 26 and the opening portion cover 18 is fixed at the closed position P1.

According to the present embodiment, because the opening portion cover 18 is fixed at the closed position in a state in which the lens unit 30 is removed from the camera body 12, foreign matter such as dirt and dust can be deterred from entering the inside of the camera body 12. In a state in which the lens unit 30 is mounted to the camera body 12, the opening portion cover 18 is moved to the open position and the opening portion 16 is opened. Therefore, because light from the lens unit 30 passes through the opened opening portion 16 and is directly made incident inside the camera body 12, affects such as optical loss and reflection become fewer in comparison to devices in which transparent glass or the like is disposed at the opening portion, and adverse optical affects can be eliminated.

It should be noted that, in a state in which the lens unit 30 is mounted to the camera body 12, foreign matter does not enter the inside of the camera body 12 through the opening portion 16 because the opening portion 16 is closed by the lens unit 30.

Also, because the opening portion cover 18 is pressed by the lens unit 30 and moves to the open position P2, it is not necessary to independently conduct an operation to move the opening portion cover 18 to the open position P2, whereby convenience is improved.

Also, in the present embodiment, the coil springs 28 are disposed. Thus, because the opening portion cover 18 is automatically moved from the open position P2 to the closed position P1 by the urging force of the coil springs 28 when the lens unit 30 is removed, high convenience can be obtained.

Second Embodiment

In the present embodiment, the same reference numerals will be given to portions that are the same as those in the first embodiment, and detailed description will be omitted.

Figure 4:
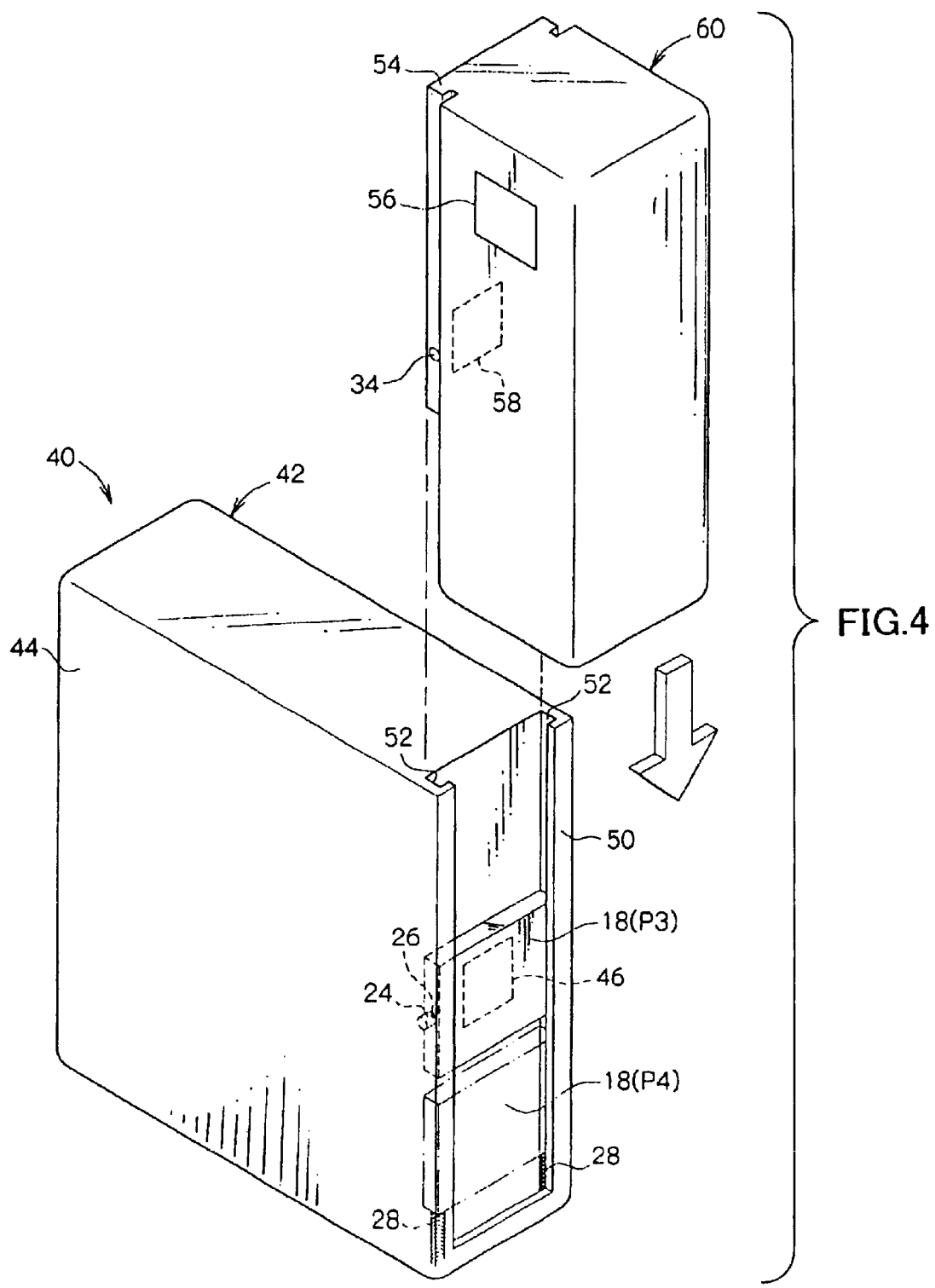
FIG. 4 is a schematic perspective view of a camera and a lens unit of a second embodiment.

As shown in FIG. 4, a camera 40 serving as the imaging device of the present embodiment is disposed with a right-angled parallelepipedal camera body 42 and a lens unit 60. An opening portion 46 for transmitting light to an unillustrated imaging element inside the camera body 42 is formed in a center of a side surface of a casing 44 of the camera body 42. The opening portion cover 18 is disposed at an outer side of the opening portion 46, and a guide member 50 is disposed at a position along a lower end edge and side ends of the side surface of the casing 44 in which the opening portion 46 is formed. Guide grooves 52 are formed in the vertical direction along an inner side of the guide member 50. Both side end portions of the opening portion cover 18 are engaged with the guide grooves 52, and the opening portion cover 18 is movable along the guide grooves 52 between a closed position P3 that closes the opening portion 46 and an open position P4 that opens the opening portion 46. The opening portion cover 18 has a structure such that it is retained at the open position P4 by the guide member 50 and mounting portions 54 of the lens unit 60.

Pin-like engagement members 24 are disposed at inner sides of the guide grooves 52, and engagement holes 26, with which the engagement members 24 can engage, are punched in two side end surfaces of the opening portion cover 18.

Two coil springs 28 are disposed along the guide grooves 52 at lower sides of both side end portions of the opening portion cover 18. One end of each coil spring 28 is fixed at a bottom surface of the guide member 50 and the other end of each coil spring 28 is fixed at a lower end surface of the opening portion cover 18. The opening portion cover 18 is urged toward the closed position P3 from the open position P4 by the coil springs 28. It should be noted that movement of the opening portion cover 18 upward from the closed position P3 is deterred by an unillustrated deterring member.

As shown in FIG. 4, the mounting portions 54 that can engage with the guide grooves 52 are positioned at side portions of a side that is mounted to the camera body 12 and are engageable with the guide grooves 52. The mounting portions 54 are formed so as to span a distance from an upper end of the lens unit 60 to a position at which it is possible to push the opening portion cover 18 down to the open position P4 in a state in which the lens unit 60 is mounted to the camera body 40 (referred to below as "the mounted state").

In a state in which the mounting portions 54 are engaged with the guide grooves 52, the lens unit 60 is movable along the guide grooves 52. The lens unit 60 is disposed with a lens window 56 that captures light at a front surface upper side and an output port 58 through which light is emitted to the camera body 42 at a position corresponding to the opening portion 46 in the mounted state.

Figure 5:
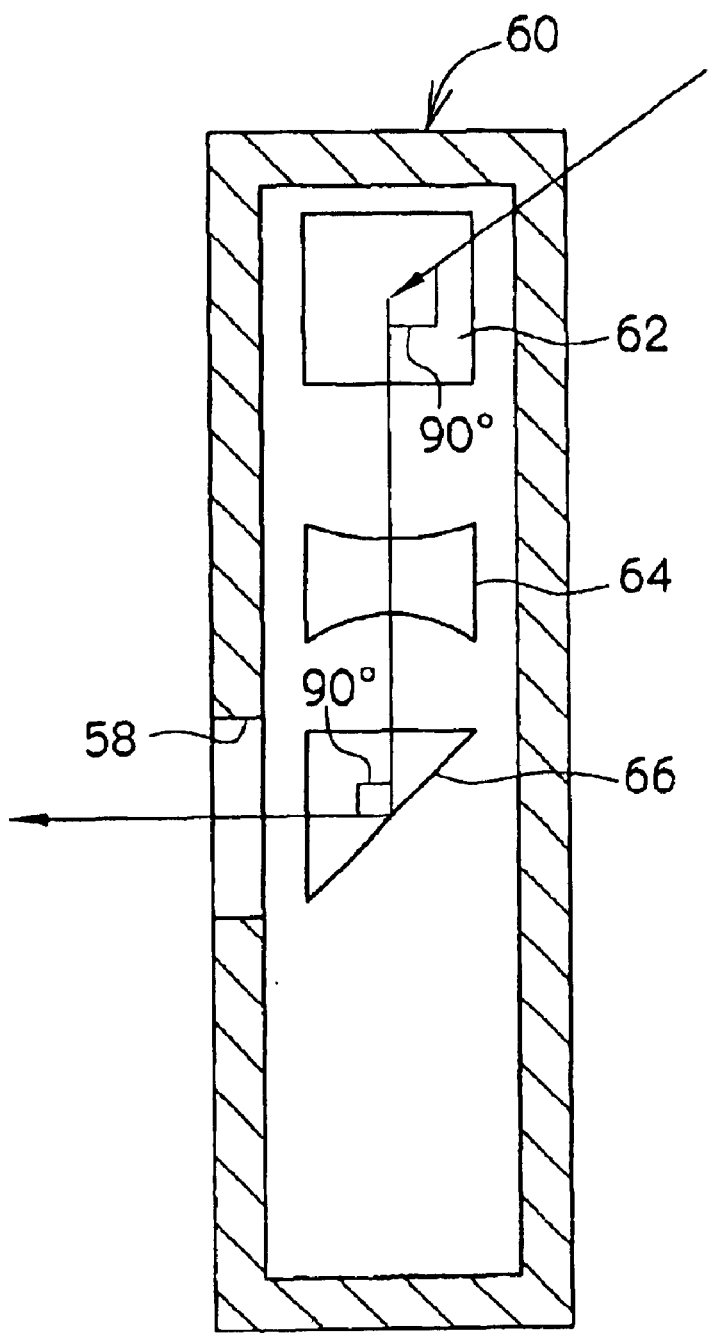
FIG. 5 is a schematic view of the inside of the lens unit of the second embodiment.

As shown in FIG. 5, a first bending member 62, which bends light captured through the lens window 56 by 90°, a lens 64, which is configured by a combination of plural lenses, and a second bending member 66, which bends light by 90° and emits the light through the output port 58, are disposed inside the lens unit 60.

Engagement holes 34, with which the engagement members 24 can engage, are punched in side end surfaces of the mounting portions 54. The engagement members 24 engage with the engagement holes 34 in a manner similar to the case of the engagement holes 26, and fix the lens unit 60 at a position closing the opening portion 46, i.e., at a lens unit 60 mounting position. The release button 25 is disposed at an outer side of the guide member 50, and by pushing down the release button 25, the engagement members 24 are pulled from inner side surfaces of the guide grooves 52, whereby the engagement with the engagement holes 34 is released.

Next, the action of the present embodiment will be described.

In a state in which the lens unit 60 is removed, the engagement members 24 and the engagement holes 26 are engaged, and the opening portion cover 18 is fixed at the closed position P3. When the lens unit 30 is to be mounted, the lower sides of the mounting portions 54 are made to engage with the upper sides of the guide grooves 52 and the lens unit 60 is moved downward along the guide grooves 52. When the lens unit 60 is moved downward and the lower sides of the mounting portions 54 are brought into contact with the upper end surface of the opening portion cover 18, the opening portion cover 18 is also pushed down counter to the elongation force of the coil springs 28 and the engagement between the engagement members 24 and the engagement holes 26 is released. When the engagement holes 34 of the lens unit 60 are moved to the positions of the engagement members 24, the engagement members 24 enter the engagement holes 34, the engagement holes 34 and the engagement members 24 engage, and the lens unit 30 is mounted to the camera body 12. At this time, the opening portion cover 18 is moved to the open position P4 and retained at this position.

When the lens unit 60 is to be removed, the user pushes the release button 25 to release the engagement between the engagement members 24 and the engagement holes 34. The lens unit 60 is moved upward along the guide grooves 52, and the engagement between the mounting portions 54 and the guide grooves 52 is released. At this time, because the opening portion cover 18 is urged from the open position P4 to the closed position P3 by the coil springs 28, the opening portion cover 18 moves upward with the lens unit 60 along the guide grooves 52. When the engagement holes 26 are moved to the positions of the engagement members 24, the engagement members 24 enter the engagement holes 26 and the opening portion cover 18 is fixed at the closed position P3.

According to the present embodiment, effects that are the same as those of the first embodiment can be obtained.

Third Embodiment

In the present embodiment, the same reference numerals will be given to portions that are the same as those in the first and second embodiments, and detailed description will be omitted.

In the second embodiment, the lens unit 60 was configured to be mounted from the upper side of the camera body 42. However, in the present embodiment, a lens unit 80 is configured to be mounted from the lower side of the camera body 42.

Figure 6:
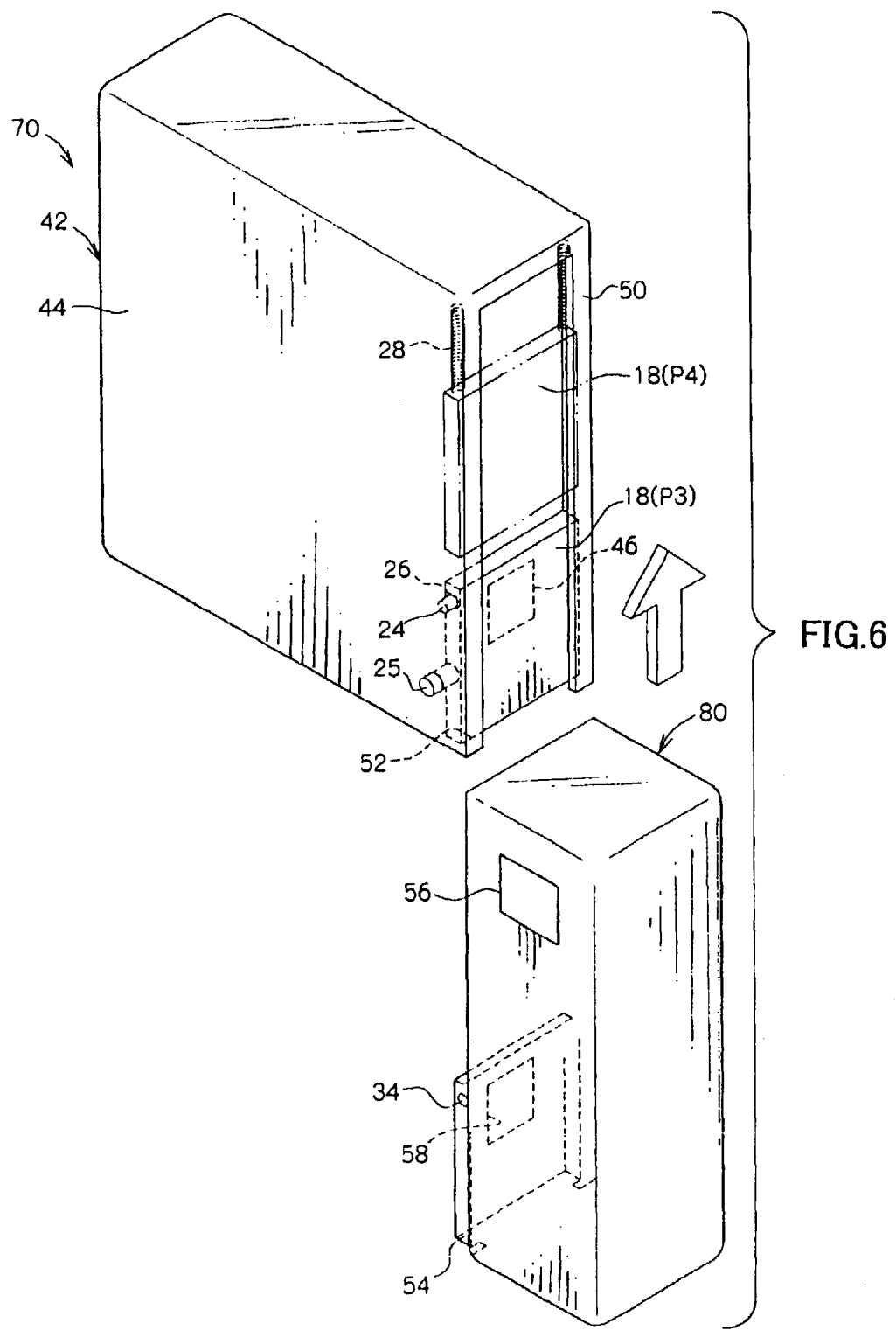
FIG. 6 is a schematic perspective view of a camera and a lens unit of a third embodiment.

As shown in FIG. 6, a camera 70 serving as the imaging device is disposed with the right-angled parallelepipedal camera body 42. The opening portion 46 for transmitting light to an unillustrated imaging element inside the camera body 42 is formed in a lower side of the side surface of the casing 44 of the camera body 42. The opening portion cover 18 is disposed at the outer side of the opening portion 46, and the guide member 50 is disposed at a position along an upper end edge and both end edges of the side surface in which the opening portion 46 is formed.

Two coil springs 28 are disposed along the guide grooves 52 at upper sides of both side end portions of the opening portion cover 18. One end of each coil spring 28 is fixed at an upper surface of the guide member 50 and the other end of each coil spring 28 is fixed at an upper end surface of the opening portion cover 18. The opening portion cover 18 is urged toward the closed position P3 from the open position P4 by the coil springs 28. It should be noted that movement of the opening portion cover 18 downward from the closed position P3 is deterred by an unillustrated deterring member.

As shown in FIG. 6, the mounting portions 54 that can engage with the guide grooves 52 are formed at the lens unit 80 at both side edges of a side that is mounted to the camera body 42. The mounting portions 54 of the lens unit 80 are formed so as to span a distance from a lower end of the lens unit 80 to a position at which it is possible to push the opening portion cover 18 up to the open position P4 in the mounted state.

The lens unit 80 is disposed with the output port 58 through which light is emitted to the camera body 42 at a position corresponding to the opening portion 46 in the mounted state of a lower side portion of the mounting surface to the camera body 42.

Figure 7:
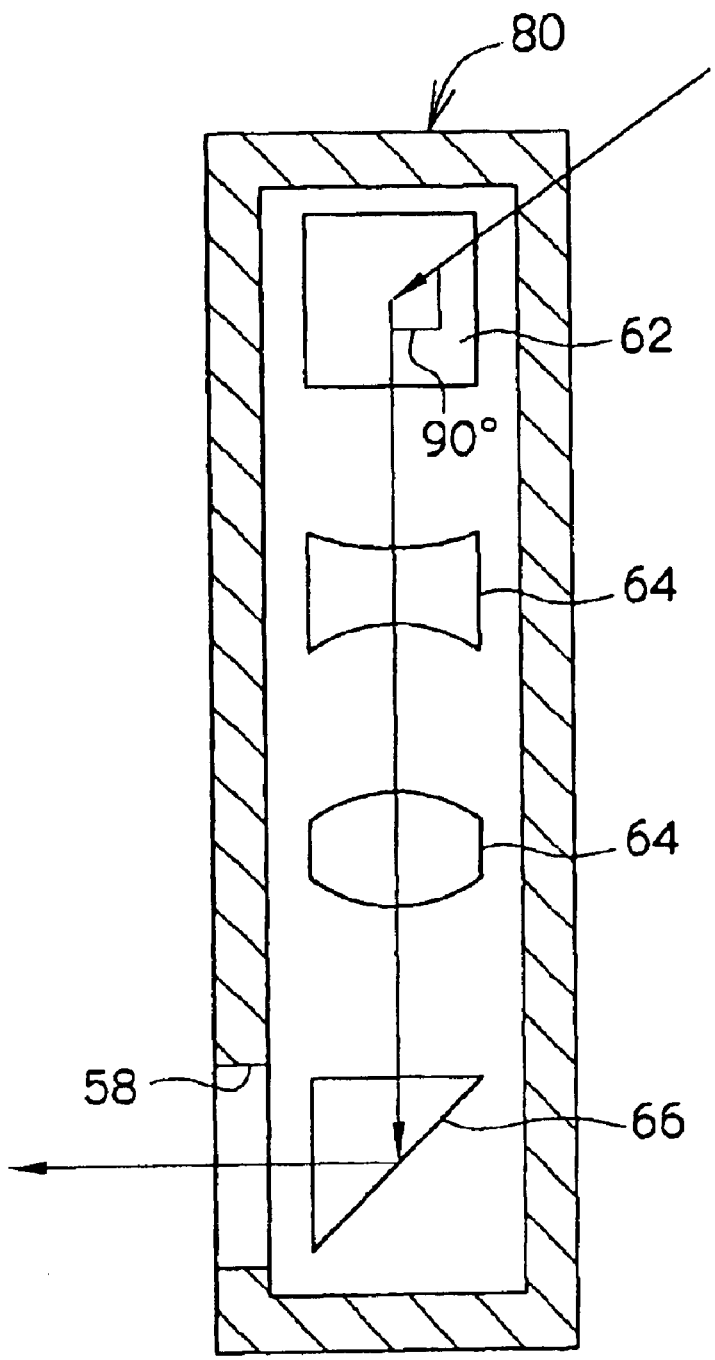
FIG. 7 is a schematic view of the inside of the lens unit of the third embodiment.

As shown in FIG. 7, the first bending member 62, which bends light captured through the lens window 56 by 90°, lenses 64, which are configured by a combination of plural lenses, and the second bending member 66, which bends light by 90° and emits the light through the output port 58, are disposed inside the lens unit 80. The second bending member 66 is disposed lower than its position in the second embodiment, but this is because the opening portion 46 and the output port 58 are also formed lower than their positions in the second embodiment.

Next, the action of the present embodiment will be described.

In a state in which the lens unit 80 is removed, the engagement members 24 and the engagement holes 26 are engaged, and the opening portion cover 18 is fixed at the closed position P3 (see FIG. 6). When the lens unit 80 is to be mounted, the user pushes the release button 25 to release the engagement between the engagement members 24 and the engagement holes 26. The upper sides of the mounting portions 54 are made to engage with the lower sides of the guide grooves 52 and the lens unit 80 is moved upward along the guide grooves 52. At this time, the upper sides of the mounting portions 54 are brought into contact with the lower end of the opening portion cover 18, the opening portion cover 18 is also pushed upward with the lens unit 80. When the engagement holes 34 of the lens unit 80 are moved to the positions of the engagement members 24, the engagement members 24 enter the engagement holes 34, the engagement holes 34 and the engagement members 24 engage, and the lens unit 80 is mounted to the camera body 42. At this time, the opening portion cover 18 is moved to the open position P4 and retained at this position.

When the lens unit 80 is to be removed, the user moves the lens unit 80 downward along the guide grooves 52 by the same procedure as in the second embodiment, and the engagement between the mounting portions 54 and the guide grooves 52 is released. At this time, because the opening portion cover 18 is urged from the open position P4 to the closed position P3 by the coil springs 28, the opening portion cover 18 moves downward with the lens unit 80 along the guide grooves 52. When the engagement holes 26 are moved to the positions of the engagement members 24, the engagement members 24 enter the engagement holes 26 and the opening portion cover 18 is fixed at the closed position P3.

According to the present embodiment, effects that are the same as those of the second embodiment can be obtained.

Additionally, because the opening portion is formed at the lower side of the side surface of the camera body 42, the output port 58 can be formed at the lower side of the lens unit 80, and the optical path length can be lengthened in comparison to the case where the output port 58 is formed in the center portion of the lens unit 80.

Fourth Embodiment

In the present embodiment, the same reference numerals will be given to portions that are the same as those in the first to third embodiments, and detailed description will be omitted.

Figure 8:
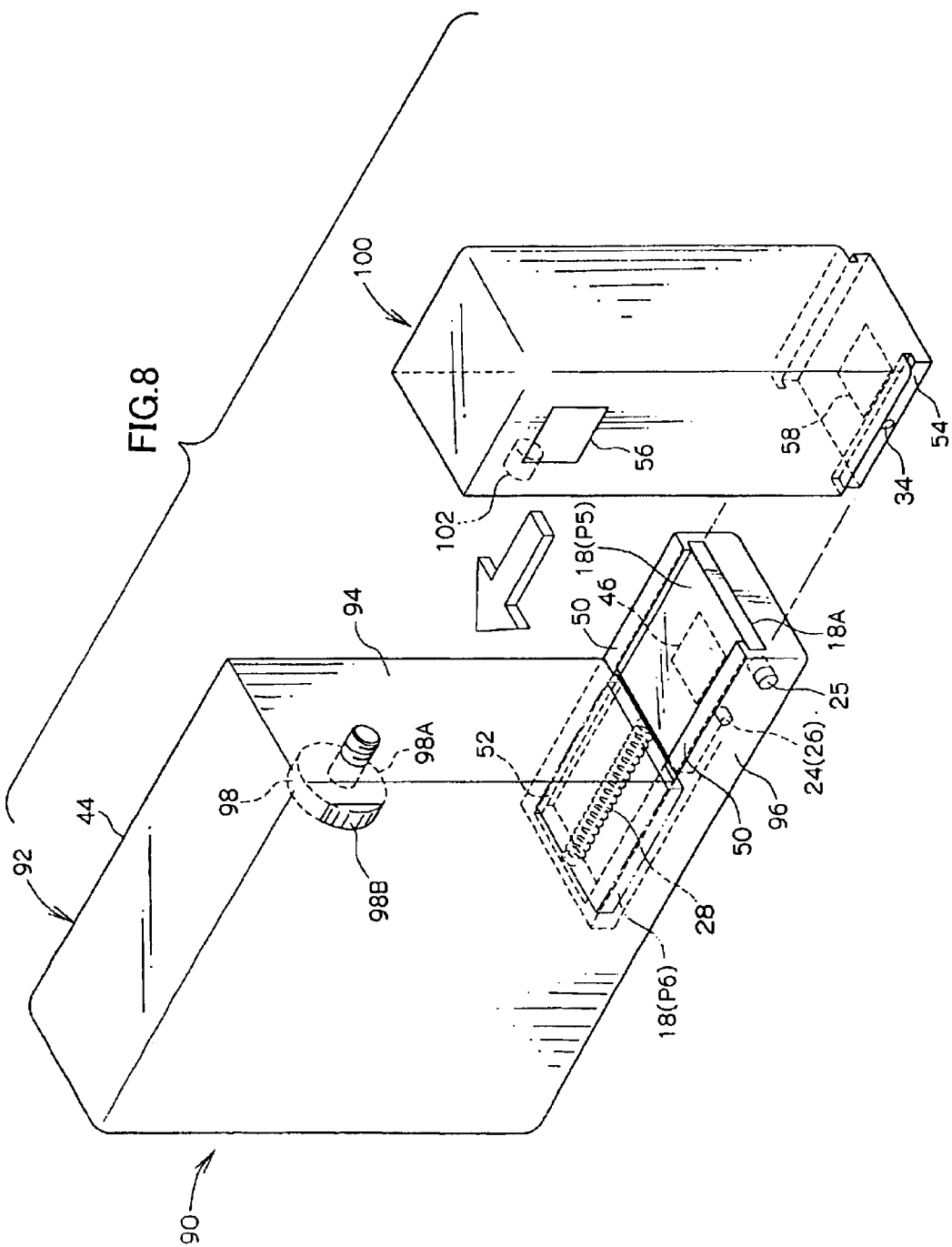
FIG. 8 is a schematic perspective view of a camera and a lens unit of a fourth embodiment.

As shown in FIG. 8, a camera 90 serving as the imaging device of the present embodiment is disposed with a right-angled parallelepipedal camera body 92. A mounting screw 98 is disposed at an upper side of a mounting surface 94, to which a lens unit 100 described later is mounted, of the camera body 92. The mounting screw 98 is configured by a screw portion 98A, with which a mounting hole 102 of the lens unit 100 can be engaged, and a dial portion 98B that is partially exposed through the casing 44. By turning the dial portion 98B downward, the screw portion 98A is rotated in a direction in which the screw portion 98A engages with the mounting hole 102, and by turning the dial portion 98B upward, the screw portion 98A is rotated in a direction in which the engagement between the screw portion 98A and the mounting hole 102 is released.

An imaging element storage portion 96 is formed at a lower side of the mounting surface 94 so as to protrude from the mounting surface 94. An imaging element 88 (see FIG. 9) is stored inside the imaging element storage portion 96, and the opening portion 46 for transmitting light to the imaging element 88 is formed in an upper surface of the imaging element storage portion 96.

The opening portion cover 18 is disposed at the outer side of the opening portion 46, and the guide member 50 is disposed from both end edges of the imaging element storage portion 96 to the inside of the camera body 92. The guide grooves 52 are formed in a horizontal direction along the inner sides of the guide member 50. Both side end portions of the opening portion cover 18 are engaged with the guide grooves 52, and the opening portion cover 18 is movable along the guide grooves 52 between a closed position P5 that closes the opening portion 46 and an open position P6 inside the camera body 92 that opens the opening portion 46. The opening portion cover 18 is structured so that it is retained at the open position P6 by the guide members 50 and the mounting portions 54 of the lens unit 100.

Because the engagement members 24, the release button 25 and the engagement holes 26 are the same as those of the second and third embodiments, detailed description thereof will be omitted.

A coil spring 28 is disposed along the guide grooves 52 at a mounting side end surface center portion of the opening portion cover 18. One end of the coil spring 28 is fixed at a deep side surface of the guide member 50 and the other end of the coil spring 28 is fixed at a camera body 92 side end surface center portion of the opening portion cover 18. The opening portion cover 18 is urged toward the closed position P5 from the open position P6 by the coil spring 28. It should be noted that movement of the opening portion cover 18 outward from the closed position P5 is deterred by an unillustrated deterring member.

As shown in FIG. 8, the mounting portions 54 that can engage with the guide grooves 22 are formed at the lens unit 100 at a front edge and a rear edge of a lower surface at the lens unit 100.

The lens unit 100 is movable along the guide grooves 52 in a state in which the mounting portions 54 are engaged with the guide grooves 52. The lens unit is disposed with the lens window 56 that captures light at a front surface upper side and the output port 58 that emits the light to the camera body 92 at a lower surface center portion.

Figure 9:
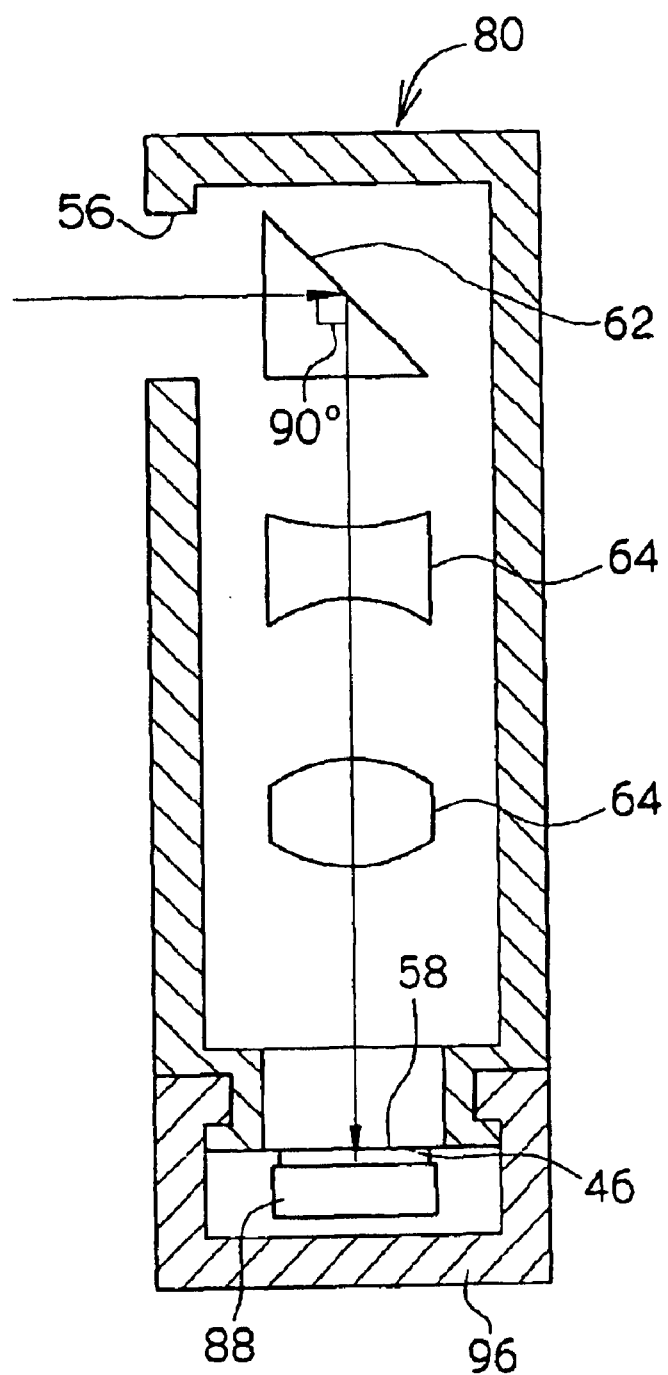
FIG. 9 is a schematic view of the inside of the lens unit of the fourth embodiment.

As shown in FIG. 9, the first bending member 62, which bends light captured through the lens window 56 by 90°, and the lenses 64, which are configured by a combination of plural lenses, are disposed inside the lens unit 100. Inside the lens unit 100, the captured light is bent one time by 90° and outputted downward of the lens unit 100, which is different from the lens units 60 and 80 of the second and third embodiments in which the captured light is bent two times.

Engagement holes 34, with which the engagement members 24 can engage, are punched in side end surfaces of the mounting members 54. The engagement members 24 engage with the engagement holes 34 in a manner similar to the case of the engagement holes 26, and can fix the lens unit 100 at the open position P6 opening the opening portion 46, i.e., at a lens unit 100 mounting position. Also, the release button 25 is disposed at an outer side of the guide member 50, and by pushing down the release button 25, the engagement members 24 are pulled from inner side surfaces of the guide grooves 22, whereby the engagement with the engagement holes 34 is released.

Next, the action of the present embodiment will be described.

In a state in which the lens unit 100 is removed, the engagement members 24 and the engagement holes 26 are engaged, and the opening portion cover 18 is fixed at the closed position P5 (see FIG. 8). When the lens unit 100 is to be mounted, the user pushes the release button 25 to release the engagement between the engagement members 24 and the engagement holes 26. The mounting sides of the mounting portions 54 engage with the guide grooves 52, and the lens unit 100 is moved toward the camera body 92 along the guide grooves 52. At this time, an end surface 18A of the opening portion cover 18 is pushed by mounting surfaces of the mounting portions 52 and moved toward the inside of the camera body 92 along the guide grooves 52. When the engagement holes 34 of the lens unit 100 are moved to the positions of the engagement members 24, the engagement members 24 enter the engagement holes 34, the engagement holes 34 and the engagement members 24 engage, and the lens unit 100 is mounted to the camera body 92. At this time, the opening portion cover 18 is moved to the open position P6 and retained at this position.

When the lens unit 100 is to be removed, the user moves the lens unit 100 along the guide grooves 52 in a direction in which the lens unit 100 is distanced from the camera body 92 by the same procedure as in the second embodiment, and the engagement between the mounting portions 54 and the guide grooves 52 is released. At this time, because the opening portion cover 18 is urged from the open position P6 to the closed position P5 by the coil spring 28, the opening portion cover 18 moves with the lens unit 100 to the outer side of the camera body 92 along the guide grooves 52. When the engagement holes 26 are moved to the positions of the engagement members 24, the engagement members 24 enter the engagement holes 26 and the opening portion cover 18 is fixed at the closed position P5.

According to the present embodiment, effects that are the same as those of the third embodiment can be obtained. Also, because the imaging element is disposed on the optical axis of the lenses 64, there is no need to bend the light after it is transmitted through the lenses 64, and a simpler configuration can be achieved.

It should be noted that, although the coil springs 28 are disposed and urge the opening portion cover 18 from the open position to the closed position in the first to fourth embodiments, the coil springs 28 are not unconditionally necessary. The opening portion cover 18 can also be manually moved from the open position to the closed position to close the opening portion. Due to the fact that the coil springs 28 are disposed, the opening portion cover 18 can be moved from the open position to the closed position in conjunction with the operation in which the lens unit is removed, and convenience is improved.

Fifth Embodiment

In the present embodiment, the same reference numerals will be given to portions that are the same as those in the first to fourth embodiments and detailed description will be omitted.

Figure 10:
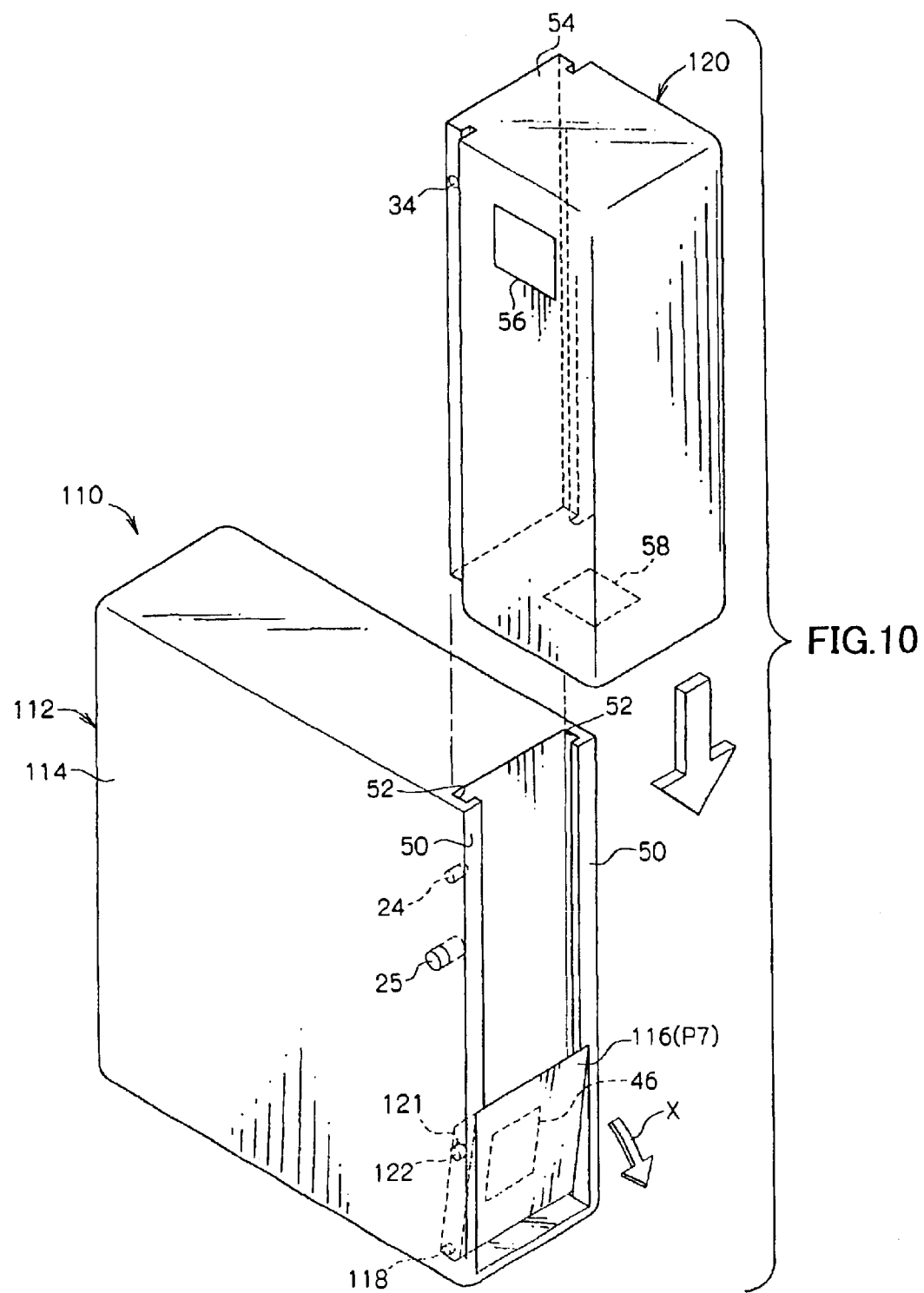
FIG. 10 is a schematic perspective view of a camera and a lens unit of a fifth embodiment.

As shown in FIG. 10, a camera 110 serving as the imaging device of the present embodiment is disposed with a right-angled parallelepipedal camera body 112. A cover member 116 serving as the opening portion cover is disposed at a side surface lower portion of a casing 114 of the camera body 112. A lower edge portion of the cover member 116 is fixed by pins 118 so that the cover member 116 is movable in the direction of X around the pins 118. Engagement holes 120 are punched in both side end surfaces of the cover member 116, and the cover member 116 is fixable at a storage position P7, which serves as the closed position, by engagement members 122 disposed at the casing 114 entering the engagement holes 120. As shown in FIGS. 11A and 11B, the storage position P7 is a position at which the cover member 116 is stored so as to slant somewhat diagonally from a position along the casing 114, and is a position at which a lower side of the cover member 116 is disposed further at an inner side of the casing 114 than an outer side of the casing 114 and at which an upper side of the cover member 116 sticks out more toward the outer side of the casing 114 than an outer surface of the casing 114. The cover member 116 swings in the direction of X so as to be movable to an open position P8 due to the upper end edge being pressed from an upper portion at the storage position P7. The cover member 116 has a structure such that it is retained at the open position P8 by the pins 118. An imaging element 88 is stored inside the cover member 116, and the opening portion 46 for transmitting light to the imaging element 88 is formed at an upper side of the cover member 116 in the open position P8. The guide member 50 is disposed, from an upper end portion across an upper side of the cover member 116 in the storage position P7, at both end edges of the side surface of the casing 44 at which the cover member 116 is disposed. The guide grooves 52 are formed in the vertical direction along inner sides of the guide members 50.

The pin-like engagement members 24 are disposed at inner sides of the guide grooves 52 and are engageable with the engagement holes 34.

As shown in FIG. 10, the mounting portions 54 that can engage with the guide grooves 52 are formed at a lens unit 120 at a side that is mounted to the camera body 112.

The lens unit 120 is movable along the guide grooves 52 in a state in which the mounting portions 54 are engaged with the guide grooves 52. Other configurations of the lens unit 120 are the same as those of the fourth embodiment.

The engagement holes 34, with which the engagement members 24 can engage, are punched in side end surfaces of the mounting portions 54. The engagement members 24 engage with the engagement holes 34 in a manner similar to the case of the engagement holes 26, and fix the lens unit 120 at a position closing the opening portion 16, i.e., at a lens unit 120 mounting position. The release button 25 is disposed at an outer side of the guide members 50, and by pushing down the release button 25, the engagement members 24 are pulled from inner side surfaces of the guide grooves 52, whereby the engagement with the engagement holes 34 is released.

Next, the action of the present embodiment will be described.

In a state in which the lens unit 120 is removed, the engagement members 122 and the engagement holes 121 are engaged, and the cover member 116 is fixed at the storage position P7 (see FIG. 11A). When the lens unit 120 is to be mounted, the user pushes the release button 25 so that the engagement members 24 are pulled from the surfaces of the guide grooves 52. The lower sides of the mounting portions 54 are made to engage with the upper sides of the guide grooves 52 and the lens unit 120 is moved downward along the guide grooves 52. When the lens unit 120 is moved downward, the lower sides of the mounting portions 54 are brought into contact with upper end portion of the cover member 116. Here, when a downward force is applied to the upper end portion of the cover member 116 by the lens unit 120, the cover member 116 swings in the direction of X because the cover member 116 is diagonally disposed and because the lower end portion of the cover member 116 is fixed by the pins 118. The engagement members 24 engage with the engagement holes 34 at a position moved to the open position P8 (see FIG. 11B), and the lens unit 120 is mounted.

When the lens unit 120 is to be removed, the user pushes the release button 25 so that the engagement between the engagement members 24 and the engagement holes 34 is released. The lens unit 120 is moved upward along the guide grooves 52 and the engagement between the mounting portions 54 and the guide grooves 52 is released. The user manually moves the cover member 116 to the storage position P7, causes the engagement members 122 to engage with the engagement holes 121, and fixes the cover member 116 at the storage position P7.

According to the present embodiment, effects that are the same as those of the second to fourth embodiments can be obtained. Additionally, because the cover member 116 is storable at the storage position P7, there is no protruding portion at the camera body 112 as in the camera body 92 of the fourth embodiment, which is convenient for when the camera body 112 is carried.

It should be noted that, although the output port 58 was configured to always be open in the first to fifth embodiments, a cover can also be disposed at the output port 58. For example, as shown in FIG. 12A, one edge of a cover 130 can be fixed by fixing members 132 so that the cover 130 can be swung around the fixing members 132 and opened and closed. As shown in FIG. 12B, a cover 134 can be vertically slid so that the cover 134 can be opened and closed. When the lens unit 60 is to be mounted, the cover 130 or 134 is opened, and when the lens unit 60 is not in use, the cover 130 or 124 is closed, whereby dirt and dust can be prevented from entering the lens unit 60.

Sixth Embodiment

In the present embodiment, the same reference numerals will be given to portions that are the same as those in the first to fifth embodiments, and detailed description will be omitted.

Figure 13:
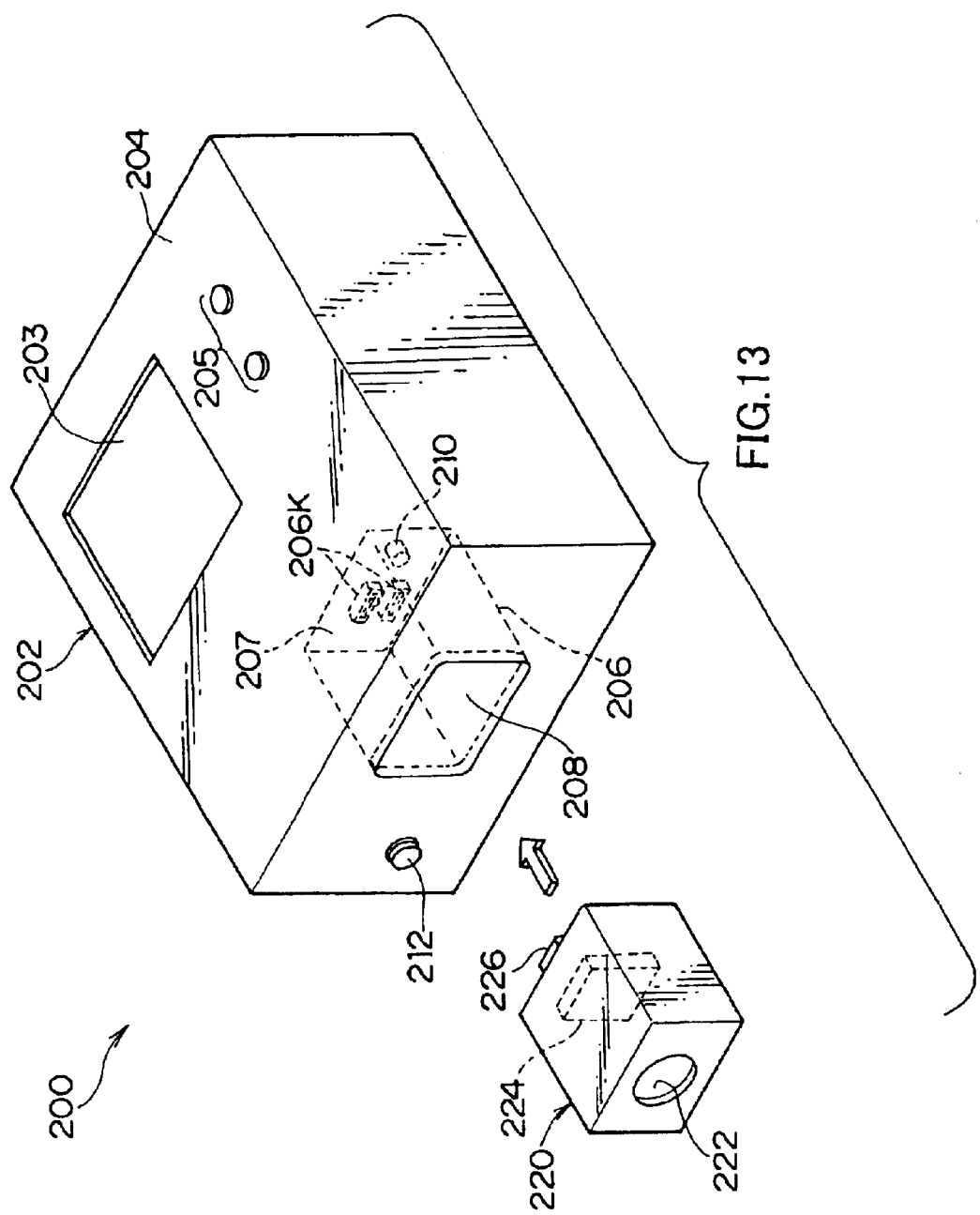
FIG. 13 is a schematic perspective view of a camera and a lens unit of a sixth embodiment.

As shown in FIG. 13, a camera 200 serving as the imaging device of the present embodiment is disposed with a right-angled parallelepipedal camera body 202 and a lens unit 220. A display 203, which can display a shot image, and plural input buttons 205, with which various instructions are inputted by the user, are disposed at one side surface of a casing 204 of the camera body 202. A release button 212 and a right-angled parallelepipedal recess that serves as a connection portion 206 are formed in another side surface of the casing 204. Plural camera connectors 206K including a connector for receiving image information shot with the lens unit 220 and a release-use convex member 210 are disposed at a deep side wall 207 of the connector 206. The release-use convex member 210 is interlocked with the release button 212. When the release-use convex member 210 is pressed, the release button 212 projects from the casing 204, and when the release button 212 is pressed, the release-use convex member 210 projects from the deep side wall 207. A plate-shaped connector cover 208 is disposed near an opening of the connector portion 206. The connector cover 208 is connected to the casing 204 by a hinge and is movable between a cover position P5, which covers the connectors 206K as shown by the solid line in FIG. 14, and an open position P6, which opens the connectors 206K as shown by the single-dot chain line. The connector cover 208 is urged in the direction of the cover position P5 by a twisted coil spring 211.

As shown in FIG. 13, the lens unit 220 is a right-angled parallelepiped that is insertable into the connector portion 206, and is disposed with a shooting lens 222 and an imaging element 224. The lens unit 220 is also disposed, at positions respectively corresponding with the camera connectors 206K, with plural lens connectors 226 including a connector for receiving imaged image information. The lens connectors 226 can be fitted to the camera connectors 206K. Due to this fitting, the release-use convex member 210 is pushed to the deep side wall 207 and the release button 212 projects from the casing 204.

Next, the action of the present embodiment will be described.

Figure 14:
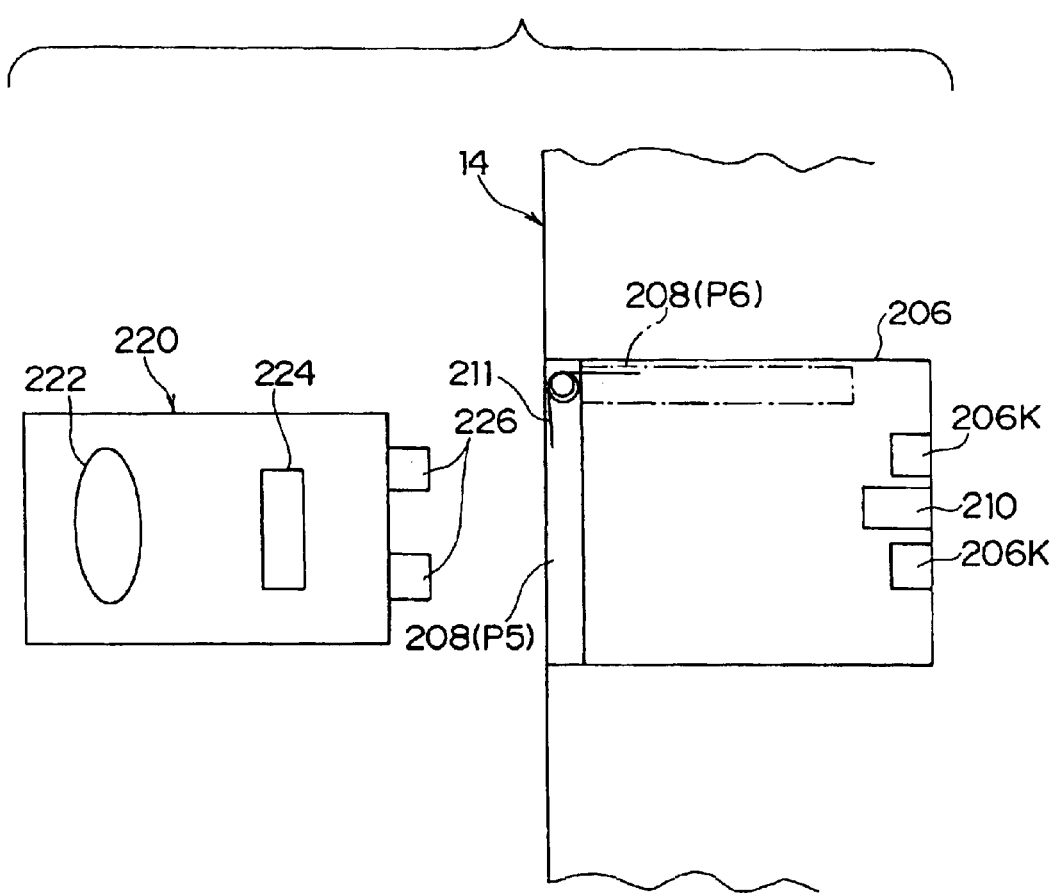
FIG. 14 is an explanatory drawing of positions of a connector cover in the sixth embodiment.

As shown in FIG. 14, in a state in which the lens unit 220 is removed, the connector cover 208 is urged by the twisted coil spring 211 and positioned at the cover position P5. When the lens unit 220 is to be mounted, the user inserts the lens unit 220 into the connector portion 206. At this time, the connector cover 208 is pressed by the lens unit 220 and moved from the cover position P5 to the open position P6. When the lens connectors 226 are fitted to the camera connectors 206K, the lens unit 220 is fixed to the connection portion 206, the release-use convex member 210 is pushed, and the release button 212 projects from the casing 204. Thus, mounting of the lens unit 220 is completed.

When the lens unit 220 is to be removed, the user pushes the release button 212. In doing so, the release-use convex member 210 projects from the deep side wall 207 and the fitting between the lens connectors 226 and the camera connectors 206K is released. The lens unit 220 is pulled out from the connector portion 206 by the user, whereby the lens unit 220 is removed. At this time, the connector cover 208 is moved from the open position P6 to the cover position P5 by the urging force of the twisted coil spring 211.

According to the present embodiment, because the connector cover 208 is disposed at the cover position P5 in a state in which the lens unit 220 is removed from the camera body 202, foreign matter such as dirt and dust can be deterred from entering the connector portion 206 and adherence of foreign matter to the connectors 206K can be prevented. Also, because the connector cover 208 is pushed by the lens unit 220 and moved to the open position P6 by mounting the lens unit 220 in the camera body 202, foreign matter such as dirt and dust can be deterred from entering the connector portion 206 during the period of time from after the connector cover 208 is opened until the lens unit 220 is mounted. Moreover, it is not necessary to independently conduct an operation to move the connector cover 208 to the open position P6, whereby convenience is improved. Also, in the present embodiment, because the twisted coil spring 211 is disposed, the connector cover 208 is automatically moved from the open position P6 to the cover position P5 by the urging force of the twisted coil spring 211 when the lens unit 220 is to be removed. Therefore, it is not necessary to independently conduct an operation to move the connector cover 208 to the open position P6, and high convenience can be obtained.

It should be noted that, although the cameras 10, 40, 70, 90 and 110 of the first to fifth embodiments were configured so that the camera received the light from the lens units, an imaging element may be disposed in the lens unit as in the present embodiment, so that image information is sent to the camera body 202 via the lens connectors 226. In this case, the camera connectors 206K are formed in place of the opening portion 16 or 46 at the camera bodies 12, 42, 92 and 112 of the cameras 10, 40, 70, 90 and 110 of the first to fifth embodiments. Also, the imaging element 224 and the lens connectors 226 are disposed at the lens units 30, 60, 80, 100 and 120.

It should also be noted that, although description was given in which a digital camera was used as an example in the first to sixth embodiments, the imaging device of the invention is not limited to a digital camera. The invention can also be applied to a silver camera or a video camera, and also to a camera-attache mobile telephone or a PDA.

What is claimed is:

1. An imaging device to which an imaging-use lens unit can be attached and from which the imaging-use lens unit can be detached, the imaging device including:
   a casing disposed with an opening portion for allowing light from the imaging-use lens unit to be made incident inside; and
   an opening portion cover that is disposed at the casing and is movable between a closed position that closes the opening portion and an open position that opens the opening portion,
   wherein, when the imaging-use lens unit is to be mounted, the opening portion cover is pushed by the imaging-use lens unit and is movable from the closed position to the open position.

2. The imaging device of claim 1, further including a moving member that causes the opening portion cover to move from the open position to the closed position in conjunction with an operation by which the imaging-use lens unit is removed.

3. The imaging device of claim 1, further including a guide member that movably guides the opening portion cover along the casing between the open position and the closed position.

4. The imaging device of claim 2, further including a guide member that movably guides the opening portion cover along the casing between the open position and the closed position.

5. The imaging device of claim 1, further including transmitting means that can transmit imaged image information to an external device.

6. An imaging device including:
   an imaging-use lens unit that can image light from a subject;
   a casing to which the imaging-use lens unit can be attached and from which the imaging-use lens unit can be detached, the casing being disposed with an opening portion for allowing light from the imaging-use lens unit to be made incident inside; and
   an opening portion cover that is disposed at the casing and is movable between a closed position that closes the opening portion and an open position that opens the opening portion,
   wherein, when the imaging-use lens unit is to be mounted, the opening portion cover is pushed by the imaging-use lens unit and is movable from the closed position to the open position.

7. The imaging device of claim 6, further including a moving member that causes the opening portion cover to move from the open position to the closed position in conjunction with an operation by which the imaging-use lens unit is removed.

8. The imaging device of claim 6, further including a guide member that movably guides the opening portion cover along the casing between the open position and the closed position.

9. The imaging device of claim 7, further including a guide member that movably guides the opening portion cover along the casing between the open position and the closed position.

10. The imaging device of claim 6, wherein the imaging-use lens unit includes deflecting means that deflects an optical axis of incident light.

11. The imaging device of claim 7, wherein the imaging-use lens unit includes deflecting means that deflects an optical axis of incident light.

12. The imaging device of claim 8, wherein the imaging-use lens unit includes deflecting means that deflects an optical axis of incident light.

13. The imaging device of claim 9, wherein the imaging-use lens unit includes deflecting means that deflects an optical axis of incident light.

14. The imaging device of claim 6, further including transmitting means that can transmit imaged image information to an external device.

15. An imaging device to which an imaging-use lens unit including an imaging element can be attached and from which the imaging-use lens unit can be detached, the imaging device including:
   a casing disposed with a connector for receiving image information imaged by the imaging-use lens unit; and
   a connector cover that is disposed at the casing and is movable between a cover position that covers the connector and an open position that opens the connector,
   wherein, when the imaging-use lens unit is to be mounted, the connector cover is pushed by the imaging-use lens unit and is movable from the cover position to the open position.

16. The imaging device of claim 15, further including a moving member that causes the connector cover to move from the open position to the cover position in conjunction with an operation by which the imaging-use lens unit is removed.

17. The imaging device of claim 15, further including a guide member that movably guides the connector cover along the casing between the open position and the cover position.

18. The imaging device of claim 16, further including a guide member that movably guides the connector cover along the casing between the open position and the cover position.

19. The imaging device of claim 15, further including transmitting means that can transmit image information to an external device.

20. The imaging device of claim 16, further including transmitting means that can transmit image information to an external device.

* * * * *